(12) United States Patent
Ryu

(10) Patent No.: US 10,808,757 B2
(45) Date of Patent: Oct. 20, 2020

(54) AIR BEARING AND ROTOR SYSTEM

(71) Applicant: INDUSTRY-UNIVERSITY COOPERATION FOUNDATION HANYANG UNIVERSITY ERICA CAMPUS, Ansan-si, Gyeonggi-do (KR)

(72) Inventor: Keun Ryu, Seoul (KR)

(73) Assignee: INDUSTRY-UNIVERSITY COOPERATION-FOUNDATION HANYANG UNIVERSITY ERICA CAMPUS, Ansan-si (KR)

( * ) Notice: Subject to any disclaimer, the term of this patent is extended or adjusted under 35 U.S.C. 154(b) by 0 days.

(21) Appl. No.: 16/272,667

(22) Filed: Feb. 11, 2019

(65) Prior Publication Data

US 2019/0170190 A1    Jun. 6, 2019

Related U.S. Application Data

(63) Continuation of application No. PCT/KR2017/008741, filed on Aug. 11, 2017.

(30) Foreign Application Priority Data

Aug. 12, 2016  (KR) .......................... 10-2016-0103304
Aug. 11, 2017  (KR) .......................... 10-2017-0102148

(51) Int. Cl.
*F16C 32/06* (2006.01)
*F16C 27/06* (2006.01)
(Continued)

(52) U.S. Cl.
CPC ............ *F16C 32/06* (2013.01); *F16C 17/024* (2013.01); *F16C 17/042* (2013.01); *F16C 27/06* (2013.01);
(Continued)

(58) Field of Classification Search
CPC .... F16C 17/024; F16C 17/042; F16C 17/107; F16C 27/045; F16C 27/06; F16C 27/063;
(Continued)

(56) References Cited

U.S. PATENT DOCUMENTS 4,776,077  A  * 10/1988  Gu ........................ F16C 17/042
                                                              216/100
2014/0140645 A1*  5/2014  Meacham ............... F16O 33/02
                                                              384/129

FOREIGN PATENT DOCUMENTS

EP    3098452 A1 * 11/2016 ............. F04D 17/12
JP    7-189601 A    7/1995
(Continued)

OTHER PUBLICATIONS

International Search Report for PCT/KR2017/008741 dated Nov. 22, 2017 (PCT/ISA/210).

*Primary Examiner* — Phillip A Johnson
(74) *Attorney, Agent, or Firm* — Sughrue Mion, PLLC

(57) ABSTRACT

Provided is a rotor system including: a rotating shaft structure including a shaft and a thrust disc formed in a radial direction of the shaft; at least one journal air bearing including a journal bearing support which is made of a rigid body to support a load applied to the shaft by air, a journal spring which encloses an outer surrounding surface of the journal bearing support to provide a elastic support force to the journal bearing support, and a journal damper which encloses the outer surrounding surface of the journal bearing support to dissipate energy from vibration applied to the journal bearing support; and at least one thrust air bearing including a thrust bearing support which is made of a rigid body to support a load applied to the thrust disc by air, a thrust spring which is positioned on one surface of the thrust bearing support to provide a elastic support force to the thrust bearing support, and a thrust damper which is posi- (Continued)

tioned on one surface of the thrust bearing support to dissipate energy from vibration applied to the thrust bearing support.

10 Claims, 5 Drawing Sheets

(51) Int. Cl.
  *F16C 29/02* (2006.01)
  *F16C 17/02* (2006.01)
  *F16C 17/04* (2006.01)
(52) U.S. Cl.
  CPC .......... *F16C 27/063* (2013.01); *F16C 29/025* (2013.01); *F16C 32/0603* (2013.01); *F16C 2316/10* (2013.01); *F16C 2360/23* (2013.01)

(58) Field of Classification Search
  CPC .. F16C 32/06; F16C 32/0603; F16C 2360/24; F16C 2360/44; F16C 2360/45; F16C 2360/46
  See application file for complete search history.

(56) References Cited

FOREIGN PATENT DOCUMENTS

| | | |
|---|---|---|
| JP | 2005-248799 A | 9/2005 |
| KR | 10-0661702 B1 | 12/2006 |
| KR | 10-2008-0064579 A | 7/2008 |
| KR | 10-2009-0062075 A | 6/2009 |
| KR | 10-2011-0023319 A | 3/2011 |
| KR | 10-2013-0091445 A | 8/2013 |
| KR | 10-1445063 B1 | 10/2014 |
| KR | 10-1497970 B1 | 3/2015 |
| WO | WO-2014062373 A1 * | 4/2014 .............. F16C 17/10 |

* cited by examiner

[Fig. 1]
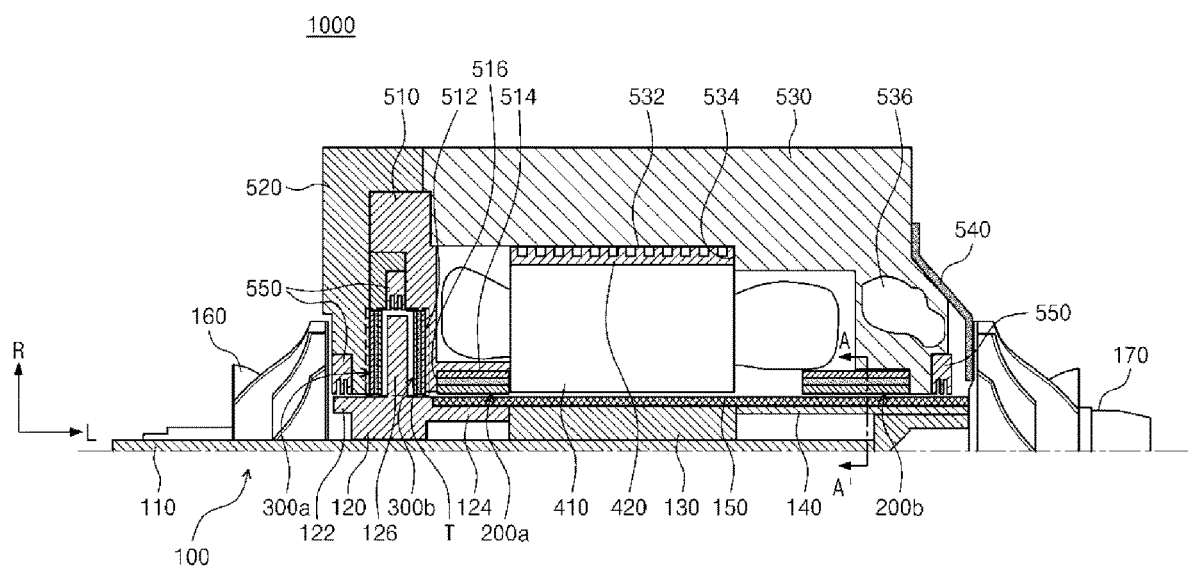

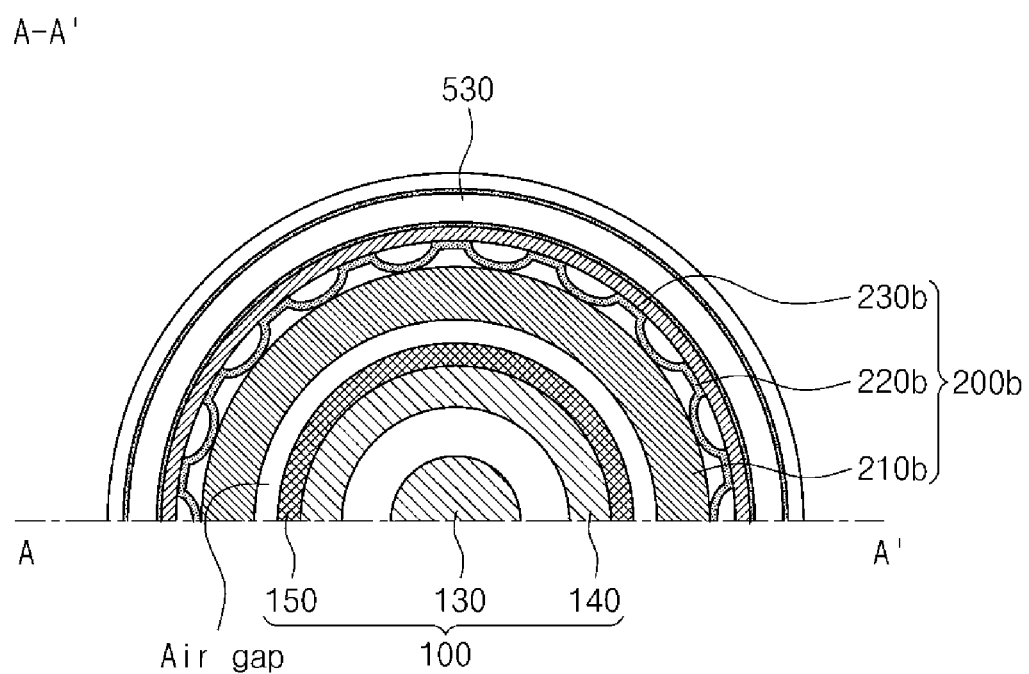
[Fig. 2]

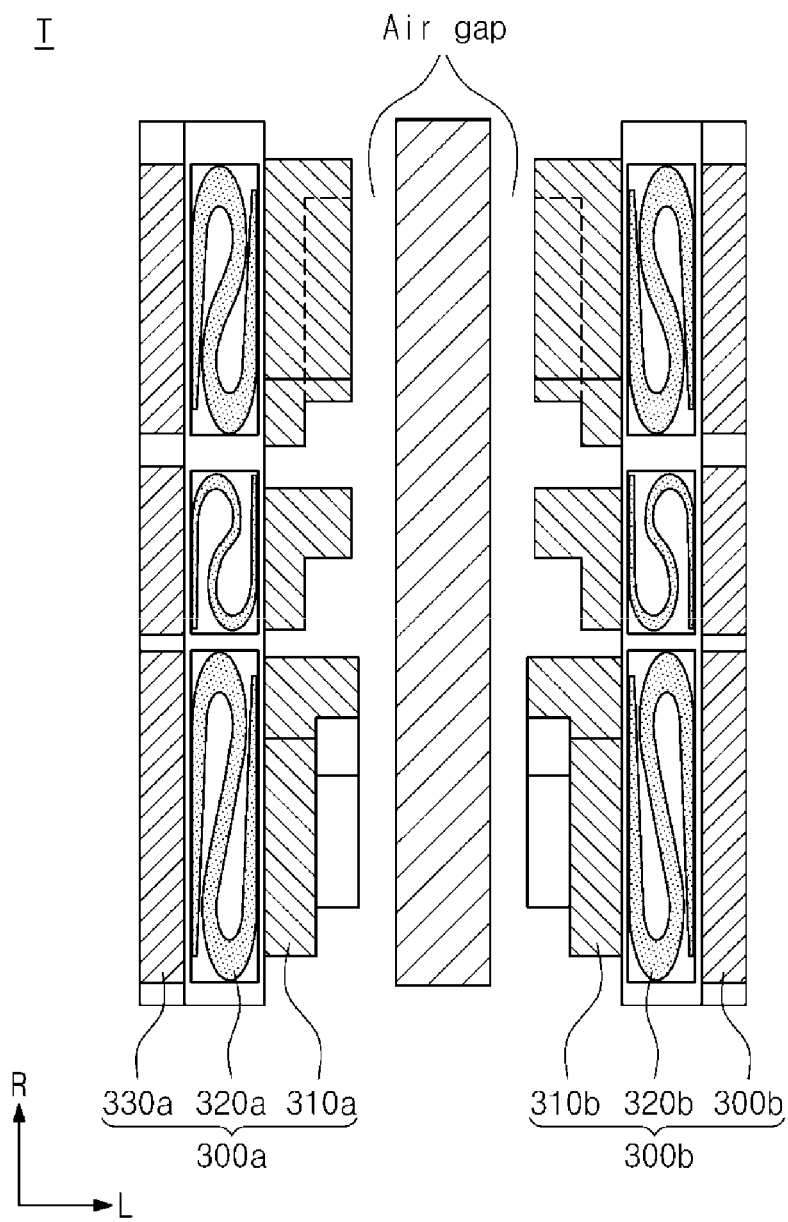
[Fig. 3]

[Fig. 4]
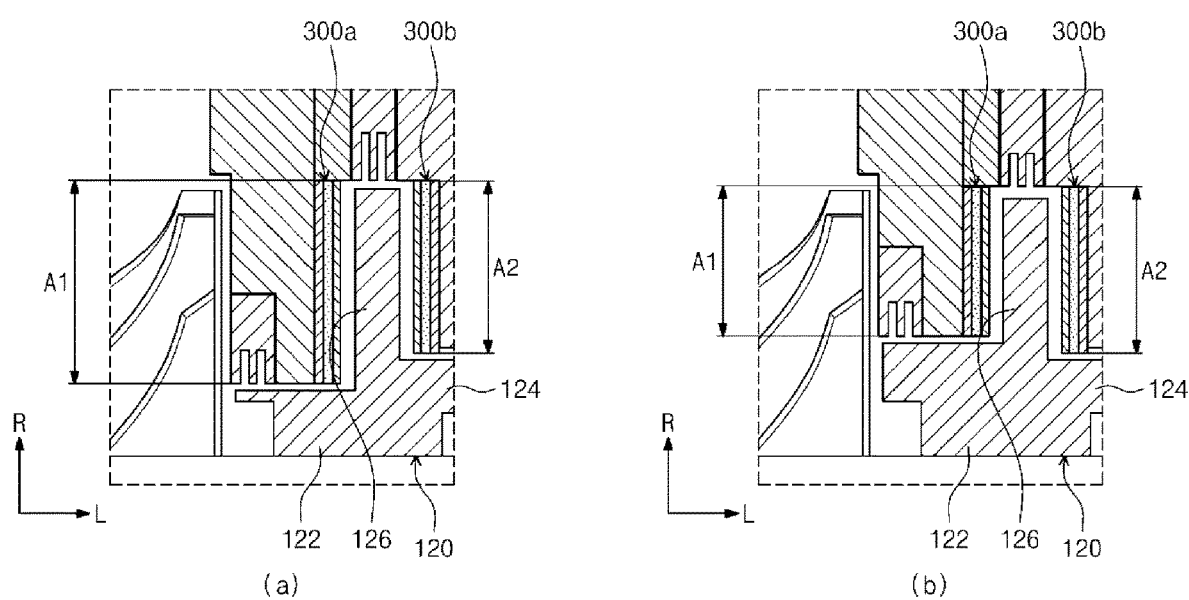

[Fig. 5]
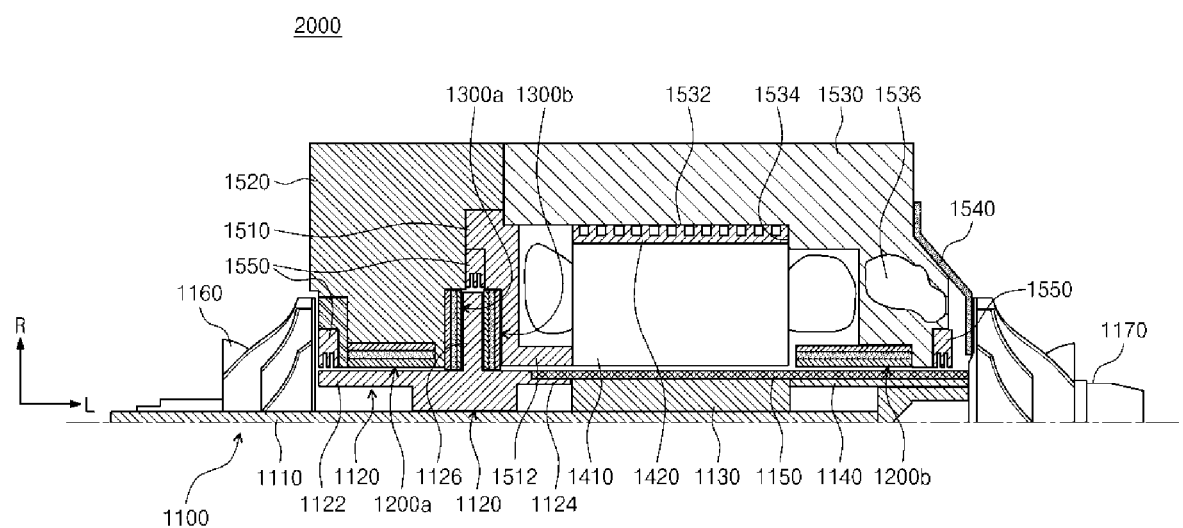

AIR BEARING AND ROTOR SYSTEM

CROSS-REFERENCE TO RELATED APPLICATION

This application is a continuation of pending International Application No. PCT/KR2017/008741, which was filed on Aug. 11, 2017 and claims priority to Korean Patent Application No. 10-2016-0103304, filed on Aug. 12, 2016, and No. 10-2017-0102148, filed on Aug. 11, 2017 in the Korean Intellectual Property Office, the disclosures of which are hereby incorporated by reference in their entireties.

BACKGROUND

1. Field

The present invention relates to an air bearing and a rotor system.

2. Description of the Related Art

A bearing is a mechanical element that restricts relative movement of desired motion and reduces friction between moving parts, and that is disposed on a component opposite to rotating or reciprocating component, such as a shaft or an axle, to receive and support a load of the component.

The bearing is classified into a journal bearing that supports a load applied in a radial direction of the shaft, and a thrust bearing that supports a load in a axial direction of the shaft, depending upon a shaft supporting direction Also, the bearing is classified into a rolling element bearing, a magnetic bearing and a fluid film bearing depending upon a structure of the bearing.

An air bearing is operated by air, contrary to a conventional rolling element bearing. Since the air bearing has advantages of significantly smaller power loss than the rolling element bearing and little abrasion wear caused by friction physical contact in the bearing components, the air bearing can be semi-permanently used. Also, since the air bearing is lubricated by air, it has another advantage of preventing environmental pollution from occurring in a process of treating oil used for a rotating machine.

However, there is a limit to the air bearing in that due to expansion of constitutional elements, such as a shaft and a bearing, caused by heat, and expansion of a rotation rotating shaft caused by a centrifugal force at rotation, an interference clearance of the bearing is decreased to damage the system.

Therefore, the inventor proposed an air bearing capable of stably supporting rotation of a shaft and a rotor system including the air bearing.

SUMMARY

Accordingly, the present invention has been made in view of the above-mentioned problems occurring in the prior art, and it is an object of the present invention to provide an air bearing having improved rotordynamic stability and a rotor system including the same.

Another object of the present invention is to provide an air bearing capable of accommodating expansion of each constitutional element caused by heat and high-speed rotation and expansion of operating area.

The present invention is not limited to the above-described objects.

According to one aspect of the present invention, there is provided an air bearing including: a bearing support which is made of a rigid body and is positioned outside a rotating shaft structure in a radial direction of the rotating shaft structure to support rotation of the rotating shaft structure by air; a spring which encloses an outer surrounding surface of the bearing support to provide a elastic support force to the bearing support; and a damper which encloses the outer surrounding surface of the bearing support to dissipate energy from vibration applied to the bearing support.

According to the other aspect of the present invention, there is provided an air bearing including: a bearing support which is made of a rigid body and is positioned on one side of a rotating shaft structure to support an axial load of the rotating shaft structure by air; a spring which is positioned on one surface of the bearing support to provide a elastic support force to the bearing support; and a damper which is positioned on one surface of the bearing support to dissipate energy from vibration applied to the bearing support.

According to another aspect of the present invention, there is provided a rotor system including: a rotating shaft structure including a shaft and a thrust disc formed in a radial direction of the shaft; at least one journal air bearing including a journal bearing support which is made of a rigid body to support a load applied to the shaft by air, a journal spring which encloses an outer surrounding surface of the journal bearing support to provide a elastic support force to the journal bearing support, and a journal damper which encloses the outer surrounding surface of the journal bearing support to dissipate energy from vibration applied to the journal bearing support; and at least one thrust air bearing including a thrust bearing support which is made of a rigid body to support a load applied to the thrust disc by air, a thrust spring which is positioned on one surface of the thrust bearing support to provide a elastic support force to the thrust bearing support, and a thrust damper which is positioned on one surface of the thrust bearing support to dissipate energy from vibration applied to the thrust bearing support.

According to one embodiment, a first rotating impeller, the first thrust air bearing, the thrust disc, the second thrust air bearing, the first journal air bearing, a stator for providing a rotating force to the rotating shaft structure, the second journal air bearing and a second rotating impeller which is heavier than the first rotating impeller may be disposed in the axial direction of the shaft.

According to one embodiment, a first rotating impeller, the first journal air bearing, the thrust air bearing, the thrust disc, the second thrust air bearing, a stator for providing a rotating force to the rotating shaft structure or generating electricity, the second journal air bearing and a second rotating impeller which is heavier than the first rotating impeller may be disposed in the axial direction of the shaft.

According to one embodiment, a support surface of the second journal air bearing for supporting a load applied to the shaft by air may be wider than that of the first journal air bearing for supporting the load applied to the shaft by air.

According to one embodiment, a temperature of air flowing to the second rotating impeller may be higher than that of air flowing to the first rotating impeller.

According to one embodiment, the first housing may support one surface of the second thrust air bearing to provide a positioning force to the second thrust air bearing in an axial direction of the shaft, and may support a lateral surface and one surface of the first journal air bearing to provide a positioning force to the first journal air bearing in the axial direction of the shaft and in a radial direction of the shaft.

According to one embodiment, the first housing may extend beyond the thrust disc in a radial direction of the thrust disc, and the housing may further have a second housing and a third housing which enclose an outside of the first housing.

According to one embodiment, if the load applied to the thrust disc toward the first rotating impeller is bigger than the load applied to the thrust disc toward the second rotating impeller, a support surface of the first thrust air bearing for supporting the thrust disc by the air may be wider than a support surface of the second thrust air bearing for supporting the thrust disc by air.

According to one embodiment, if the load applied to the thrust disc toward the second rotating impeller is bigger than the load applied to the thrust disc toward the first rotating impeller, a support surface of the second thrust air bearing for supporting the thrust disc by the air may be wider than a support surface of the first thrust air bearing for supporting the thrust disc by air.

According to one embodiment, a gap between the thrust air bearing support and the thrust disc of the rotating shaft structure may be wider than that between the journal air bearing support and the rotating shaft structure in a radial direction.

According to embodiments of the present invention, the air bearing is provided, in which the portion of the bearing support which directly interfaces with the rotor is made of a rigid body, and the bearing support is supported by the spring and the damper. Therefore, the present invention actively accommodates the geometric deformation of the bearing and/or shaft caused by dynamic instability of the rotor and the heat/rotation thereof, thereby performing the smooth operation of the rotor system under severe operation conditions, such as ultrahigh speed, high temperature and external excitation.

Also, since the structure of the housing is simple and thus is assembled in a compact shape, the whole size of the system can be reduced, and an influence of accumulated clearances can be reduced when assembling.

According to the above embodiments, it can improve assembling ability and dynamic stability of the rotor, and can accommodate the expansion of the bearing and the shaft caused by the heat and high-speed rotation, thereby expanding the operation area. In addition, the strength and stability of the bearing is increased by the external pressure when rotating.

BRIEF DESCRIPTION OF THE DRAWINGS

FIG. 1 is a cross-sectional view illustrating a rotor system according to a first embodiment of the present invention.

FIG. 2 is a cross-sectional view taken along the line A-A' in FIG. 1 to illustrate a journal air bearing according to a first embodiment of the present invention.

FIG. 3 is an enlarged view of the section T in FIG. 1 to illustrate a thrust air bearing according to a first embodiment of the present invention.

FIG. 4 is view illustrating a modified embodiment of the thrust air bearing according to the first embodiment of the present invention.

FIG. 5 is a partially cross-sectional view illustrating a rotor system according to a second embodiment of the present invention.

DETAILED DESCRIPTION OF THE EMBODIMENTS

Hereinafter, preferred embodiments of the present invention will be explained in detail with reference to the accompanying drawings. The above described embodiments of the present invention are intended to be illustrative only. Numerous alternative embodiments may be devised by those skilled in the art without departing from the scope of the following claims.

In the following description, in case where any constitutional element is disposed on other constitutional element, it means that it may be directly provided on other constitutional element, or a third constitutional element may be interposed therebetween. Also, in the drawings, shapes and sizes of elements are exaggerated for the purpose of effective description of technical contents.

It will be understood that, although the terms "first", "second", etc., may be used herein to distinguish one element from another element, the terms are not meant to be limiting. These terms are only used to distinguish one element from another. For example, a first element could be termed a second element, and, similarly, a second element could be termed a first element, without departing from the scope of example embodiments. Also, in the description, the term "A and/or B" means "at least one of A and B."

The same or equivalent components, members and processes shown in the drawings are given the identical reference numerals and the repeated description thereof will be omitted as appropriate. The terms "comprising" and "including" in the discussion directed to the present invention and the claims are used in an open-ended fashion and thus should be interrupted to mean "including", but not limited thereto. Also, in the description, the word "connection" means that plural constitutional elements are directly or indirectly connected to each other.

In the following description, detailed descriptions of well-known functions or constructions will be omitted since they would obscure the invention in unnecessary detail.

FIG. 1 is a cross-sectional view illustrating a rotor system according to the first embodiment of the present invention. FIG. 2 is a cross-sectional view taken along the line A-A' in FIG. 1 to illustrate a journal air bearing according to the first embodiment of the present invention. FIG. 3 is an enlarged view of the section T in FIG. 1 to illustrate a thrust air bearing according to the first embodiment of the present invention.

Referring to FIG. 1, a rotor system 1000 according to the first embodiment of the present invention may include at least one of a rotating shaft structure 100, air bearings 200a, 200b, 300a and 300b for supporting rotation of the rotating shaft structure 100, and housings 510, 520 and 530. Also, the rotor system 1000 may further include a stator 410 for providing a rotating force to the rotating shaft structure 100 or generating an electric current corresponding to a rotating force of the rotating shaft structure 100. Hereinafter, each configuration will be described in detail. FIG. 1 shows an upper end of the rotor system 1000 when seen from the longitudinal cross-sectional view, while since the configuration of a lower end is symmetrical to that of the upper end, the detailed illustration and description will be omitted herein.

Rotating Shaft Structure 100

The rotating shaft structure 100 is a rotatably structure which is inserted in a hollow portion of the rotor system 1000 according to the first embodiment of the present invention in a axial direction L.

The rotating shaft structure 100 may include any one of a shaft 110, a thrust disc 120, a rotor 130, a shaft sleeve 140, a rotor sleeve 150, a first rotating impeller 160 and a second rotating impeller 170.

The shaft 110 is a configuration corresponding to the rotating shaft of the rotating shaft structure 100, and extends from the first rotating impeller 160 to the second rotating impeller 170. It is of course that one end of the shaft 110 protrudes from the first rotating impeller 160, and protrudes from the second rotating impeller 170.

The shaft 110 may be made of a material having a low coefficient of thermal expansion, for example, at least one of Invar36, Kovar, Incoloy903, Incoloy907, Incoloy909 and Ti-6A1. Also, the thrust disc 120, the shaft sleeve 140 and the rotor sleeve 150, which will be described later, may be made of a material having a low coefficient of thermal expansion, for example, at least one of Invar36, Kovar, Incoloy903, Incoloy907, Incoloy909 and Ti-6A1.

The thrust disc 120 is configured to be rotated with the shaft 110, and may be disposed in a radial direction R of the shaft 110. A surface of the thrust disc 120 may be coated by DLC or chrome to improve frictional resistance.

The thrust disc 120 may transmit a static and/or dynamic load, for example, vibration, to the thrust bearings 300a and 300b in the axial direction L of the shaft 110. To this end, the thrust disc 120 may have a thrust body 126 extending from the shaft 100 in the radial direction R.

In addition, the thrust disc 120 may have a thrust disc blade 122 and a second thrust disc blade 124 to fix the thrust disc 120.

The rotor 130 receives the rotational force from the stator 410, or transmits the rotational force, which is applied to the shaft 110, to the stator 410 to generate the corresponding electricity. To this end, an outer surrounding surface of the rotor 130 may be provided with a permanent magnet or a winding (not illustrated).

The shaft sleeve 140 may be disposed to enclose the outer surrounding surface of the shaft 110 in the radial direction R. According to one embodiment, the shaft sleeve 140 may fix the rotor 130 together with the second thrust disc blade 124. In other aspects, one side of the rotor 130 may be positioned by one side of the shaft sleeve 140, and the other side of the rotor 130 may be positioned by one side of the second thrust disc blade 124.

The rotor sleeve 150 may enclose the outer surrounding surface of the rotor 130, so that the rotor sleeve 150 fixes a component, for example, the permanent magnet, disposed on the outer surrounding surface of the rotor 130. Further, the rotor sleeve 150 extends beyond the rotor 130 in the axial direction to press at least one of a top surface of the second thrust disc blade 124 and a top surface of the shaft sleeve 140. Accordingly, the rotor sleeve 150 fixes the second thrust disc blade 124 and the shaft sleeve 140 against the centrifugal force generated when the shaft 110 is rotated.

The surface of the rotor sleeve 150 may be coated by DLC or chrome to improve the frictional resistance.

The first rotating impeller 160 may be disposed on one side of the shaft 110, while the second rotating impeller 170 may be disposed on the other side of the shaft 100. For example, the first rotating impeller 160 may be a compressor blade, while the second rotating impeller 170 may be a turbine blade. In case where the first rotating impeller 160 and the second rotating impeller 170 function as each blade of a gas turbine or a turbo charger, the temperature of air flowing to the outer surrounding surface of the rotating shaft structure 100 through the first rotating impeller 160 may be lower than that of the air flowing to the outer surrounding surface of the rotating shaft structure 100 through the second rotating impeller 170.

According to one embodiment, the respective components of the rotating shaft structure 100, that is, the first rotating shaft 160, the thrust disc 120, the rotor 130, the shaft sleeve 140 and the second rotating impeller 170 may be disposed in order in the axial direction L of the rotating shaft structure 100.

The rotating shaft structure may include at least one of the above-described configurations, but may include only the shaft, for example.

The rotating shaft structure 100 according to the embodiment of the present invention has been described hereinbefore. The journal air bearings 200a and 200b according one embodiment of the present invention will now be described with reference to FIGS. 1 and 2.

Journal Air Bearings 200a and 200b

The journal air bearing is configured to support a radial load of the rotor system 1000, for example, a self-load and vibration of the rotating shaft, and at least one journal air bearing, two journal air bearings in this embodiment, may be provided in the axial direction L of the rotor system 1000. For example, the first journal air bearing 200a is positioned toward the first rotating impeller 160, while the second journal air bearing 200b is positioned toward the second rotating impeller 170.

More specifically, referring to FIG. 2 showing the cross-sectional view taken along the line A-A' in FIG. 1, the journal air bearing 200b may include any one of a bearing support 210b made of a rigid body and positioned outside the rotating shaft structure 100 in the radial direction R to support the rotation of the rotating shaft structure 110 by air, a spring 220b enclosing the outer surrounding surface of the bearing support 210b to provide a elastic support force to the bearing support 210b, and a damper 230b enclosing the outer surrounding surface of the bearing support 210b to dissipate energy from the vibration applied to the bearing support 210b. The respect components will be described in detail later.

The bearing support 210b may be disposed to be spaced apart from the rotating shaft structure 100 in the radial direction R, with an air gap being interposed between the bearing support and the rotating shaft structure. In other words, the bearing support 210b is disposed to enclose the rotating shaft structure 100 in a circumferential direction, with the air gap being interposed therebetween. The rotation of the rotating shaft structure 100 is supported by the air gap.

The bearing support 210b may be made of a rigid body, so that it can transmit the static and/or dynamic load, for example, vibration, produced from the shaft 110 to any one of the spring 220b and the damper 230b.

Even though the bearing support 210b is thermally deformed by the heat which is generated between the outer surface of the bearing support 210b and the inner surface of the thrust body 126 due to the rotation of the shaft 110, or the heat transmitted from the first hot rotating impeller 160 or the second hot rotating impeller 170 through the housings 510, 520 and 530, the spring 220b does not deformed in the radial direction R, thereby minimizing the deformation of the air gap. In other aspects, in case where the air gap directly interfaces with the bearing support 210b, without the bearing support 210b, the bearing support is thermally deformed by the heat generated from the rotation. In this instance, the air gap formed in the radial direction R is unintendedly varied at any position in the axial direction, and thus becomes very small, thereby damaging the system.

On the contrary, according to this embodiment, since the spring 220b is resiliently deformed, it is possible to prevent the size of the air gap from becoming smaller, even though the bearing support 210b is thermally deformed.

According to one embodiment, the bearing support 210b may have any one of an oval shape, three robes, an offset, a taper, a tilting pad and a groove. Also, the bearing support 210b may be made of a material having a low coefficient of thermal expansion, for example, at least one of Invar36, Kovar, Incoloy903, Incoloy907, Incoloy909 and Ti-6A1. The surface of the bearing support 210b may be coated by a solid-film lubrication, for example, any one of Teflon, graphite and MoS2.

According to one embodiment, the surface of the bearing support 210b is provided with a hole, which is an air bearing having a hybrid bearing capable of feeding pressurized air from the exterior. A lower end of the bearing sleeve may be provided with a chamber to feed the air, and a pipe can be directly connected to the bearing sleeve.

The spring 220b may come into directly contact with the outer surrounding surface of the bearing support 210b in the circumferential direction. Instead, the damper 230b may come into directly contact with the outer surrounding surface of the bearing support 210b in the circumferential direction, and the spring 220b may come into directly contact with the outer surrounding surface of the damper 230b in the circumferential direction. In summary, the bearing support 210b, the spring 220b and the damper 230b may be disposed in order in the radial direction, or the bearing support 210b, the damper 230b and the spring 220b may be disposed in order. Hereinafter, the case of disposing the bearing support 210b, the spring 220b and the damper 230b in order will be described for descriptive convenience.

The spring 220b is to provide the elastic support force against the vibration applied to the bearing support 210b. To this end, the spring 220b may include any one of a beam spring, an O-ring, a wave spring, a bump-type foil, a wing-type foil, a compliant spring, a hemispheric foil and a wire mesh.

The damper 230b is to dissipate the vibration applied to the bearing support 210b. To this end, the damper 230b may include any one of a squeeze film damper, a viscoelastic damper, a bump-type foil, a wing-type foil, a compliant spring, a hemispheric foil and a wire mesh. The squeeze film damper may be disposed together with the O-ring.

Although the above description focuses on the second journal air bearing 200b, the first journal air bearing 200a may include the same configuration as that of the second journal air bearing 200b. For example, the first journal air bearing 200a may include the bearing support 210a, the spring 220a and the damper 230a. The other configuration is substantially identical to the second journal air bearing 200b, and thus the duplicated description thereof will be omitted therein.

The journal air bearings 200a and 200b according to one embodiment of the present invention have been described hereinbefore. The thrust bearings 300a and 300b according to one embodiment of the present invention will be described with reference to FIGS. 1 and 3.

Thrust Air Bearings 300a and 300b

The thrust air bearing is to support the static and/or dynamic load of the rotor system 1000 in the axial direction L, and at least one thrust air bearing may be provided in the axial direction L of the rotor system 100. In this embodiment, two thrust air bearings are provided. For example, the first thrust air bearing 300a is positioned on one side of the thrust body 126, while the second thrust air bearing 300b is positioned on the other side of the thrust body 126.

More specifically, referring to FIG. 3, the thrust air bearing 300a may include any one of a bearing support 310a made of a rigid body and positioned on one side of the rotating shaft structure 100 to support the static and/or dynamic load, for example, vibration, of the rotating shaft structure 110 in the axial direction L by air, a spring 320a positioned on one surface of the bearing support 310a to provide a elastic support force to the bearing support 310a, and a damper 330a positioned on one surface of the bearing support 310a to dissipate the vibration applied to the bearing support 310a.

According to one embodiment, the bearing support 310a of the first thrust air bearing 300a may be disposed to be spaced apart from the thrust body 126, with an air gap being interposed between the bearing support and the thrust air bearing, thereby supporting the static and/or dynamic load of the thrust body 126.

The bearing support 310a may include at least one of a tapered land, a step, a pocket, a parallel face, a groove and a tilting pad. The bearing support 310a may have any one of an oval shape, three robes, an offset, a taper, a tilting pad and a groove. Also, the bearing support 210b may be made of a material having a low coefficient of thermal expansion, for example, at least one of Invar36, Kovar, Incoloy903, Incoloy907, Incoloy909 and Ti-6A1. The surface of the bearing support 310a may be coated by a solid-film lubrication, for example, at least one of Teflon, graphite and MoS2.

The spring 320a and the damper 330a may be provided in order on one surface of the bearing support 310a, while the damper 330a and the spring 320a may be provided in order on the surface thereof.

The configuration of the spring 320a and the damper 330a will be not described in detail herein, since it is substantially identical to the journal air bearing.

Although the above description focuses on the first thrust air bearing 300a, since it can be applied to the second thrust air bearing 300b, the description for the second thrust air bearing 300b will be omitted herein.

The thrust air bearings 300a and 300b according to one embodiment of the present invention will be described with reference to FIG. 3.

According to one embodiment, the first rotating impeller 160, the first thrust air bearing 300a, the thrust disc 120, the second thrust air bearing 300b, the first journal air bearing 200a, the stator 410 for providing the rotating force to the rotating shaft structure or generating the electricity, the second journal air bearing 200b and the second rotating impeller 170 may be disposed in the axial direction of the shaft 110. According to one embodiment, the second rotating impeller 170 may be heavier than the first rotating impeller 160.

In this instance, a support surface of the second journal air bearing 200b for supporting the static and/or dynamic load, for example, vibration, generated from the shaft by air may be wider than that of the first journal air bearing 200a for supporting the static and/or dynamic load, for example, vibration, generated from the shaft by air. It considers the case where the second rotating impeller 170 is heavier than the first rotating impeller 160. In other aspects, the second journal air bearing 200b and the first journal air bearing 200a may have an asymmetrical shape depending upon the support load.

In case where the first rotating impeller 160 is a compressor blade, while the second rotating impeller 170 is a turbine blade (i.e., if the rotor system 1000 is a gas turbine or a turbo charger), the temperature of air flowing to the rotor system 1000 through the first rotating impeller 160 may be lower than that of the air flowing to the rotor system 1000 through the second rotating impeller 170. In this instance, the thrust disc 120 is posited closer to the first rotating impeller 160, relative to the second rotating impeller 170, thereby minimizing the thermal deformation of the thrust disc 120.

According to one embodiment, a gap between the thrust air bearing supports 310a and 310b and the thrust disc 120 of the rotating shaft structure 100 may be wider than that between the journal air bearing supports 210a and 210b and the rotating shaft structure 100 in the radial direction R. This is to more actively accommodate the geometric deformation of the thrust disc which occurs under severe operation conditions, such as high load and temperature.

Hereinafter, the housing of the rotor system 1000 according to the first embodiment of the present invention will be described with reference to FIG. 1.

Housing

Referring to FIG. 1, the housing houses the internal components of the rotor system 1000, and may include a plurality of parts for the purpose of convenience of assembly. For example, the housing may include a first housing 510, a second housing 520 and a third housing 540.

The first housing 510 may have a first surface 512 which supports one surface of the second thrust air bearing 300b to provide a positioning force to the second thrust air bearing 300b in an axial direction of the shaft, a second surface 516 which supports a lateral surface of the first journal air bearing 200a to provide a positioning force to the first journal air bearing 300b in the axial direction of the shaft, and a third surface 514 which supports one surface of the first journal air bearing 200a to provide a positioning force to the first journal air bearing 200a in the radial direction of the shaft. Therefore, the first housing 510 can fix the second thrust air bearing 300b and the first journal air bearing 200a.

The second housing 520 is positioned on one side of the first housing 510, for example, toward the first rotating impeller 160, to enclose at least a portion of the first housing 510. The third housing 520 is positioned on one side of the first housing 510, for example, toward the second rotating impeller 170, to enclose at least a portion of the first housing 510. Since the housings are separated on the basis of the thrust disc 120, it is possible to improve the assembly convenience of the rotor system 1000.

In other aspects, the first housing 510 fixes the second thrust air bearing 300b and the first journal bearing 200a, the second housing 520 fixes the first thrust air bearing 300a, and the third housing 530 fixes the second journal air bearing 200b.

The third housing 530 may have a first surface 532 for fixing a cooling housing 420 which supplies cooling water to the state 410, and a second surface 534 for providing a positioning force to the cooling housing 420 in the axial direction L of the shaft 110. Also, the third housing 530 may further have a cooling channel 536 along which the cooling water flows. One side of the third housing 530 may be provided with a heat shield.

According to one embodiment, the air channel may be provided with a sealing member 550 for preventing unwanted leakage of the air. The sealing member may be provided with a stepped portion to vary a flow of the air. Since the stepped portion varies the flow of the air, it is possible to minimize a pressure difference when the air flows in the rotor system 1000. Therefore, the rotor system 1000 can be stably rotated at high speed.

Hereinafter, a modified embodiment of the thrust air bearing according to the present invention will be described with reference to FIG. 4.

FIG. 4 is view illustrating the modified embodiment of the thrust air bearing according to the first embodiment of the present invention.

The modified embodiment of the thrust air bearing is to provide a supporting force in case where a load applied to one surface of the thrust disc 120 is different from a load applied to the other surface.

Referring to FIG. 4a, in case where the load applied toward the first rotating impeller 160 is bigger than the load applied toward the second rotating impeller 170, the support surface A1 of the first thrust air bearing 300a for supporting the thrust disc 120 by the air may be wider than the support surface A2 of the second thrust air bearing 300b for supporting the thrust disc 120 by the air, thereby providing the stable supporting force to the thrust disc 120.

Referring to FIG. 4b, in case where the load applied to the thrust disc toward the second rotating impeller 170 is bigger than the load applied to the thrust disc toward the first rotating impeller 160, the support surface A2 of the second thrust air bearing 300b for supporting the thrust disc 120 by the air is wider than the support surface A1 of the first thrust air bearing 300a for supporting the thrust disc 120 by the air, thereby providing the stable supporting force to the thrust disc 120.

Hereinbefore, the rotor system 1000 according to the first embodiment of the present invention has been described with reference to FIGS. 1 to 4, and the journal air bearings 200a and 200b and the thrust air bearings 300a and 300b have been described. Now, a rotor system 2000 according to the second embodiment of the present invention will be described with reference to FIG. 5.

FIG. 5 is a partially cross-sectional view illustrating the rotor system 2000 according to the second embodiment of the present invention.

Referring to FIG. 5, the rotor system 2000 according to the second embodiment of the present invention may include at least one of a rotating shaft structure 1100, air bearings 1200a, 1200b, 1300a and 1300b for supporting rotation of the rotating shaft structure 100, and housings 1510, 1520 and 1530. Also, the rotor system 1100 may further include a stator 1410 for providing a rotating force to the rotating shaft structure 1100 or generating an electric current corresponding to a rotating force of the rotating shaft structure 1100.

The first embodiment is substantially identical to the second embodiment, except for the internal arrangement, and thus the detailed description for the same configurations will be omitted herein.

In the rotor system 2000 according to the second embodiment, the first rotating impeller 1160, the first journal air bearing 1200a, the first thrust air bearing 1300a, the thrust disc 1120, the second thrust air bearing 1300b, the stator 1410 for providing the rotating force to the rotating shaft structure 1100, the second journal air bearing 1200b and the second rotating impeller 1170 may be disposed in the axial direction of the shaft 1100. According to one embodiment, the second rotating impeller 1170 may be heavier than the first rotating impeller 1160.

In this instance, a support surface of the second journal air bearing 1200b for supporting the static and/or dynamic load, for example, vibration, generated from the shaft by air may be wider than that of the first journal air bearing 1200a for supporting the static and/or dynamic load, for example, vibration, generated from the shaft by air. It considers the case where the second rotating impeller 1170 is heavier than the first rotating impeller 1160. In other aspects, the second journal air bearing 1200b and the first journal air bearing 1200a may have an asymmetrical shape depending upon the support load.

In case where the first rotating impeller 1160 is a compressor blade, while the second rotating impeller 1170 is a turbine blade (i.e., if the rotor system 2000 is a gas turbine or a turbo charger), the temperature of air flowing to the rotor system 2000 through the first rotating impeller 1160 may be lower than that of the air flowing to the rotor system 2000 through the second rotating impeller 1170. In this instance, the thrust disc 1120 is posited closer to the first rotating impeller 1160, relative to the second rotating impeller 1170, thereby minimizing the thermal deformation of the thrust disc 1120.

According to one embodiment, a gap (direction L) between the thrust air bearing support and the thrust disc 1120 may be wider than that between the journal air bearing support and the rotating shaft structure 1100 in the radial direction R. This is to more actively accommodate the geometric deformation of the thrust disc which occurs under severe operation conditions, such as high load and temperature.

Also, the housing houses the internal components of the rotor system 2000, and may include a plurality of parts for the purpose of assembly convenience.

More specifically, a first housing 1510 may hold the second thrust air bearing 1300b. To this end, the first housing may have a fixing rod 1512 extending from the second thrust air bearing 1300b between sides of the stator 1410.

A second housing 1520 may hold the first journal air bearing 1200a and the first thrust air bearing 1300a, and a third housing 1530 may hold the second journal air bearing 1200b.

In other aspects, since the housings are separated on the basis of the thrust disc 1120, the assembly convenience of the rotor system 2000 can be improved.

The modified embodiment of the thrust air bearing according to the first embodiment of the present invention can be applied to the thrust air bearing according to the second embodiment.

According to the above-described embodiments of the present invention, the air bearing is provided, in which the portion of the bearing support which directly interfaces with the rotor is made of a rigid body, and the bearing support is supported by the spring and the damper. Therefore, the present invention actively accommodates the geometric deformation of the bearing and/or shaft caused by dynamic instability of the rotor and the heat/rotation thereof, thereby performing the smooth operation of the rotor system under severe operation conditions, such as ultrahigh speed, high temperature and external excitation.

Also, since the structure of the housing is simple and thus is assembled in a compact shape, the whole size of the system can be reduced, and an influence of accumulated clearances can be reduced when assembling.

According to the above embodiments, it can improve assembling ability and dynamic stability of the rotor, and can accommodate the expansion of the bearing and the shaft caused by the heat and high-speed rotation, thereby expanding the operation area. In addition, the strength and stability of the bearing is increased by the external pressure when rotating.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

The bearing and the rotor system according to the embodiments of the present invention can be applied to a turbo compressor, a fan, a micro turbine, a high-speed rotating appliance which is integrated with a motor and a generator, a turbo charger for a vehicle, a dental hand piece, a turbo pump, a high-speed spindle, and an air supply device for a fuel cell. Also, the bearing and the rotor system according to the embodiments of the present invention can be applied to a product employing the air bearing to improve the durability and stability of the bearing among rotating appliances supported by existing ball bearings or oil lubricated bearings, or a product which is liable to be unstable or damaged at high-speed and high-temperature operation, among rotating appliances employing existing air bearings.

What is claimed is:

1. A rotor system comprising:
a rotating shaft structure including a shaft and a thrust disc formed in a radial direction of the shaft;
at least one journal air bearing including a journal bearing support which is made of a rigid body to support a load applied to the shaft by air, a journal spring which encloses an outer surrounding surface of the journal bearing support to provide an elastic support force to the journal bearing support, and a journal damper which encloses the outer surrounding surface of the journal bearing support to dissipate vibration applied to the journal bearing support; and
at least one thrust air bearing including a thrust bearing support which is made of a rigid body to support a load applied to the thrust disc by air, a thrust damper which is positioned on one surface of the thrust bearing support to dissipate energy from vibration applied to the thrust bearing support, and a thrust spring which is positioned between the thrust bearing support, and the thrust damper to provide an elastic support force to the thrust bearing support.

2. The rotor system according to claim 1, wherein a first rotating impeller, a first thrust air bearing, the thrust disc, a second thrust air bearing, a first journal air bearing, a stator for providing a rotating force to the rotating shaft structure, a second journal air bearing and a second rotating impeller which is heavier than the first rotating impeller are disposed in an axial direction of the shaft.

3. The rotor system according to claim 2, wherein a support surface of the second journal air bearing for supporting a load applied to the shaft by air is wider than that of the first journal air bearing for supporting the load applied to the shaft by air.

4. The rotor system according to claim 2, wherein a temperature of air flowing to the second rotating impeller is higher than that of air flowing to the first rotating impeller.

5. The rotor system according to claim 2, further comprising a first housing which supports one surface of the second thrust air bearing to provide a positioning force to the second thrust air bearing in an axial direction of the shaft, and supports a lateral surface and one surface of the first journal air bearing to provide a positioning force to the first journal air bearing in the axial direction of the shaft and in the radial direction of the shaft.

6. The rotor system according to claim 5, wherein the first housing extends beyond the thrust disc in a radial direction of the thrust disc, and the rotor system further comprises a second housing and a third housing which enclose an outside of the first housing.

7. The rotor system according to claim 2, wherein, if the load applied to the thrust disc toward the first rotating impeller is bigger than the load applied to the thrust disc toward the second rotating impeller, a support surface of the first thrust air bearing for supporting the thrust disc by the air is wider than a support surface of the second thrust air bearing for supporting the thrust disc by air.

8. The rotor system according to claim 2, wherein if the load applied to the thrust disc toward the second rotating impeller is bigger than the load applied to the thrust disc toward the first rotating impeller, a support surface of the second thrust air bearing for supporting the thrust disc by the air is wider than a support surface of the first thrust air bearing for supporting the thrust disc by air.

9. The rotor system according to claim 1, wherein a first rotating impeller, a first journal air bearing, the thrust air bearing, the thrust disc, a second thrust air bearing, a stator for providing a rotating force to the rotating shaft structure or generating electricity, a second journal air bearing and a second rotating impeller which is heavier than the first rotating impeller are disposed in an axial direction of the shaft.

10. The rotor system according to claim 1, wherein a gap between the thrust bearing support and the thrust disc of the rotating shaft structure is wider than that between the journal bearing support and the rotating shaft structure in a radial direction.

* * * * *